(12) United States Patent
Kaminski et al.

(10) Patent No.: US 7,386,173 B1
(45) Date of Patent: Jun. 10, 2008

(54) GRAPHICAL DISPLAYING OF AND PATTERN RECOGNITION IN ANALYTICAL DATA STRINGS

(75) Inventors: Herbert Kaminski, Oldenburg (DE); Jan-Henner Wurmbach, Lilienthal (DE); Wolfgang Pusch, Buchholz (DE)

(73) Assignee: Bruker Daltonik GmbH, Bremen (DE)

( * ) Notice: Subject to any disclaimer, the term of this patent is extended or adjusted under 35 U.S.C. 154(b) by 792 days.

(21) Appl. No.: 10/649,340

(22) Filed: Aug. 27, 2003

(51) Int. Cl.
*G06K 9/46* (2006.01)
*G06F 3/048* (2006.01)

(52) U.S. Cl. ..................................... 382/207; 715/771

(58) Field of Classification Search ................ 382/165, 382/207; 715/771–862; 210/656; 702/31, 702/32; 706/20; 73/23.23, 23.36
See application file for complete search history.

(56) References Cited

U.S. PATENT DOCUMENTS

| | | | | |
|---|---|---|---|---|
| 3,705,383 A | * | 12/1972 | Frayer | 382/134 |
| 4,323,880 A | * | 4/1982 | Lucas | 382/170 |
| 4,823,194 A | * | 4/1989 | Mishima et al. | 382/190 |
| 4,961,231 A | * | 10/1990 | Nakayama et al. | 382/197 |
| 5,073,954 A | * | 12/1991 | Van Tyne et al. | 235/462.08 |
| 5,410,613 A | * | 4/1995 | Suzuki | 382/159 |
| 5,412,578 A | * | 5/1995 | Takagi et al. | 700/192 |
| 5,703,964 A | * | 12/1997 | Menon et al. | 382/228 |
| 5,926,564 A | * | 7/1999 | Kimura | 382/170 |
| 6,057,839 A | * | 5/2000 | Advani et al. | 715/784 |
| 6,901,165 B1 | * | 5/2005 | Egger et al. | 382/170 |

OTHER PUBLICATIONS

Joseph et al., "Bar Code Waveform Recognition Using Peak Locations", Jun. 1994, IEEE Transactions on Pattern Analysis and Machine Intelligence, vol. 16, Issue 6, pp. 630-640.*

* cited by examiner

*Primary Examiner*—Aaron W Carter
(74) *Attorney, Agent, or Firm*—Law Offices of Paul E. Kudirka

(57) ABSTRACT

The present invention relates to graphic presentations of complex analytical data strings containing each a multitude of substance-representing peaks (e.g. mass spectra or chromatograms) and pattern recognition or classification techniques in collections of such data strings. The invention proposes to highlight, after execution of the pattern recognition or classification algorithms, the significantly participating peaks in the graphical display so that the nature of these peaks, and the substances represented by these peaks, can easily be further investigated. The content of the graphical display, particularly the peaks, can be interactively accessed by the user and by the pattern recognition programs.

12 Claims, 2 Drawing Sheets

GRAPHICAL DISPLAYING OF AND PATTERN RECOGNITION IN ANALYTICAL DATA STRINGS

FIELD OF INVENTION

The present invention relates to graphic presentations of complex analytical data strings containing each a multitude of substance-representing peaks and to pattern recognition or classification techniques in collections of such data strings.

BACKGROUND OF THE INVENTION

In many fields of science, collections of mass spectra, optical absorption spectra, chromatograms, electrophorograms or other analytical peak-containing strings of digital data are investigated with respect to inherent patterns and correlations of such patterns with external parameters of the original samples where the data strings are acquired from. The strings of data describe each the distribution of "peak intensities" along a scale of a "scaling parameter" which may be a "mass" (mass spectrometry) or "retention time" (chromatography) or the like. As a rule, the acquisition of such data strings is performed by a chemical analysis procedure, and the peaks each represent a certain substance. In different strings of data, peaks with the same scaling parameter can be related and assigned by a common parameter value (e.g., "mass", "retention time" or simply a peak number) throughout the collection of data strings.

These strings of digital data can be displayed in a two-dimensional diagram showing the peaks within the data strings in graphical form. The notion "peak" designates not only just one peak in a single data string but, in a broader sense, all related peaks in the collection of data strings with a common scaling parameter value.

Mass spectra of affinity-extracted proteins from body fluids in clinical proteomics may serve as an example. Here, the peaks in the data strings are mass peaks, they each represent the signal of a protein (or some other biomolecule) having this mass. Usually, two collections of spectra are acquired, one collection from healthy patients, and another collection from patients with a well-confirmed and well-documented disease, and significant differences in the two collections of spectra are searched for. This is done first by visual inspection of a suitable graphical presentation of the collections of spectra. Greatly significant differences like peaks appearing only in one collection and lacking in the other may be found immediately in such a way. But usually refinements in the search for such differentiation parameters will be necessary. These mathematical refinements are performed by application of some pattern recognition, correlation, cluster-searching, or classification algorithms.

In some cases, even three-dimensional data ensembles are generated and investigated for inherent patterns. Examples are chromatograms of body fluids sampled before and after application of drugs, measured by LC-MS (liquid chromatography coupled with mass spectrometry). The goal is to detect the appearance of drug metabolites and other changes in composition by some regulatory effects. Here, the graphical display is more difficult, but in many cases it is sufficient to just show the total ion current chromatograms with their peaks representing the biosubstances. These total ion current chromatograms form the strings of data which can be displayed with the retention time as the scaling parameter. Only the mathematical pattern recognition investigations may take access to the mass spectra hidden behind the peaks.

There are many known kinds of graphical two-dimensional presentations for collections of such data strings: single data strings (intensity vs. scaling parameter) arranged for each data string in its own window one below the other, stacked data strings (shifted by small displacements in both dimensions), contour plots, gray scale plots, density plots, plots of averaged intensities (means) and relative standard deviations, and the like. The graphical display programs may only show the data strings in a passive way, or they may allow for interactive user access to predetermined features of the graphical presentation, like e.g. peaks, base lines, spikes or the like. The user access usually is realized by computer mouse clicking with the cursor on the selected feature.

There are likewise many programs for pattern recognition in given types of data strings. The data strings may be investigated as such, or the strings of data may be reduced beforehand to lists of peaks by "peak finding algorithms". The peak list is a special form of a data string, but characterized by two data values per peak (intensity; scaling parameter), whereas the original data string consists of a string of digital measurement values of intensities acquired in predetermined time intervals. Data strings or peak lists may be put together in "collections" stemming from different types of samples, e.g., from healthy and ill patients.

The notion "pattern recognition" is used here for all programs which search for classifying, differentiating, or correlating structures in collections of data strings or peak lists. The pattern recognition programs thus comprise classification algorithms, principal component analysis, cluster analysis, cross correlation analysis, and many others. There are "supervised pattern recognition algorithms" (sometimes called "supervised learning programs)", if different collections of data strings can be identified beforehand as belonging to different classes (e.g. healthy and ill patients), and there are "unsupervised pattern recognition algorithms", if no such membership in different classes is known beforehand.

Results of pattern recognition programs are usually shown in graphical presentations of their own; e.g., clusters are shown in a diagram with principal components as coordinates, the principal components being built by transformation of the original peak parameters in some complicated way. In these types of graphical presentation, there is no easily recognizable connection to the original peaks in the data strings and therefore no connection to the substances represented by the peaks. In some cases it may even be difficult to refer back to the peaks (and substances) responsible for some recognized pattern, e.g., if the principal components for a cluster presentation is a non-linear combination of the parameters of many peaks.

SUMMARY OF THE INVENTION

The present invention provides a method for the investigation of patterns in collections of peak-containing data strings or peak lists, whereby the method comprises the following steps:

(a) displaying the data of the collections of data strings or peak lists in graphical form, (b) calculating significant patterns, correlations or classifications within or between the collections of data strings or peak lists by pattern recognition algorithms, thereby including a determination of the peaks significantly participating in the pattern generation, and (c) highlighting, in the graphical display of the data strings or peaks lists, the peaks significantly participating in the pattern generation.

The highlighting in step (c) may be performed by marking the background of peaks in color, coloring connection lines of data, coloring peaks, indicating the peaks by a colored line, framing, or the like.

With this method the researcher can inspect the collections of data strings before and after the mathematical investigation, and easily check the success of the pattern recognition programs.

The invention may further include that features of the graphical display of the data strings, particularly the peaks, can be interactively accessed by the user, e.g., by clicking on the peaks with the computer mouse. The researcher sometimes can already visually find significant peaks for a differentiation of collections of data strings before the mathematical algorithms are applied. It is essential for most pattern recognition programs, to start from a favorable set of peaks. The pattern recognition programs very often use recursive program loops, the processing time and processing success of which very much depend on good start conditions. Therefore the interactive use of the displayed data allows for easily selecting, from the display, a promising set of peaks across the spectra, just by picking the start peaks with a mouse click on the computer screen. The performance and the results of the pattern recognition programs can be easily checked by results presented by the program in graphical or textual form, supported by visual inspection of the highlighted peaks in the displayed data strings.

On the other hand, some pattern recognition programs eliminate, from their result list of peaks, some very significant peaks just because these peaks correlate strongly with other peaks and do not contain additional non-redundant information. The information may not be essential for the mathematical differentiation of clusters or classes, but these peaks are essential for the medical or biomolecular researcher to decide whether the represented substances really bear information about diseases or other stress factors. The inventive method, therefore, additionally allows, after visual inspection or after a correlation analysis, to mark peaks by mouse clicks to be compulsorily incorporated into the list of significant peaks.

Furthermore, the inventive method invites the researcher to investigate, by trial and error, different mathematical methods and different start conditions.

With this method the researcher in the field is immediately informed about significant peaks, and he can start further investigations with respect to the nature and behavior of the pattern-determining peaks and substances, e.g., by starting analysis procedures which reveal the structure and identity of the substances by measuring daughter ion mass spectra of these substances.

Or the researcher can ask, in an easy way, for more detailed results of the mathematical investigations, e.g., by clicking on the peak and immediately seeing highlighted all other peaks significantly being correlated with the selected peak in some or other way, or showing detailed diagrams on scattering profiles of the same peaks throughout the collection, or exhibiting other detailed results of the mathematical calculations. The details of this checking procedure are dependent on the kind of mathematical investigation started by the researcher.

DETAILED DESCRIPTION

Figure 1:
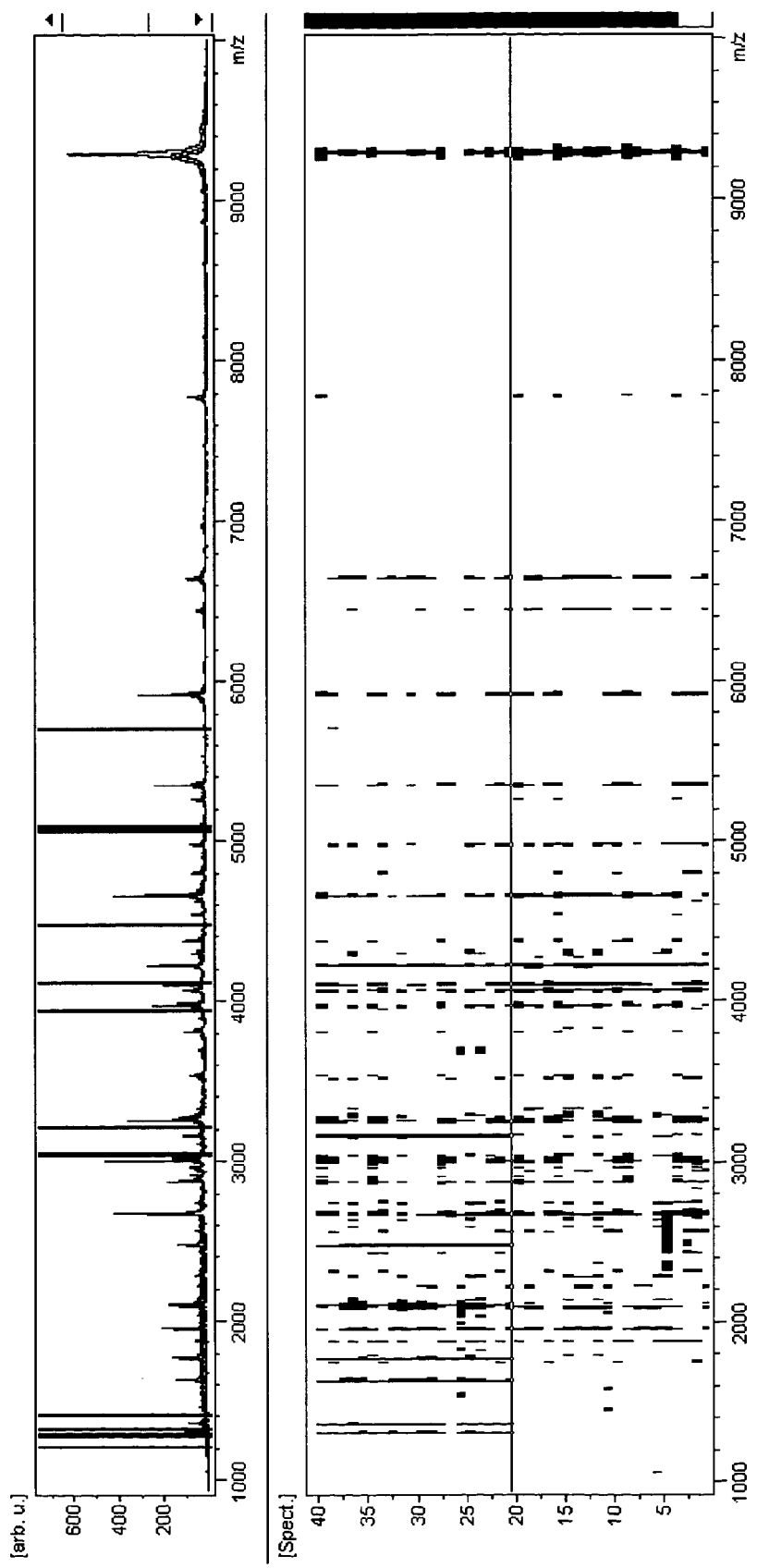
FIG. 1 presents in the upper part a display of the average values of two collections of data strings each, both (originally in different colors) curves superimposed, and in the lower part a density plot of the data strings. The density plot is thresholded to a black/white display, otherwise details would be lost by printing.

The invention will be described in detail using the example of clinical proteomics by mass spectrometric investigation of affinity-captured protein extractions from body fluids.

Clinical proteomics is a research branch searching for marker patterns which can be used to recognize early states of diseases which cannot be found otherwise, or which can only be diagnosed hitherto by very complicated and costly procedures. In a more general sense, clinical proteomics tries to gain insight into mechanisms for protein regulation by stresses. A widely used procedure is described here.

From two groups of patients, healthy patients and patients with a well-characterized disease, individual samples of body fluid are acquired. Blood, urine, saliva, lymph, or spinal fluid may serve as such a body fluid, even cell lysates or cell culture supernatants may be used; all samples must belong to the same type of body fluid.

Proteins are extracted from these samples by affinity extraction: Magnetic nanobeads coated with affinity substances capturing a broad group of proteins are added to the samples. Several types of affinity nanobeads are commercially available, capturing different groups of proteins. (Other procedures use affinity spots on flat supports; but these spots do have lower catching capacity). The suspended nanobeads can be stirred through the sample liquid in small vials by magnetic forces; the proteins are thereby affinity bonded to the surface of the nanobeads. The nanobeads then can be magnetically held firmly at the surface of the vials for subsequent washing procedures. Finally, the proteins can be dissolved again by some elution fluid, and the proteins from the samples can be prepared on sample carrier plates for mass spectrometric analysis with ionization by matrix-assisted laser desorption (MALDI) in time-of-flight mass spectrometers (TOF-MS).

The sample handling can preferredly be performed in microtitre plates with 96 wells each which serve as sample vials. Relatively simple pipetting and sample handling robots are available for the complete sample handling with magnetic nanobeads. The robots can transfer the protein extracts to the MALDI sample plates. MALDI sample plates with 96 or even 386 prefabricated sample spots are commercially available.

The protein samples are then investigated by mass spectrometry, and mass spectra are acquired for each sample. Excluding the sampling and documentation process of the body fluids, the whole sample handling and mass spectrometric analysis process for nearly a hundred samples can be easily performed in three to four hours.

The mass spectra thus obtained represent the data strings basic to this invention. In clinical proteomics, however, it is favorable to simplify the data strings by several mathematical procedures, before graphical display and pattern recognition is performed.

First, the sample string is transformed into a complex peak list by a peak finding algorithm which, in most cases, is combined with an algorithm for the determination of the exact peak masses.

Second, the complex peak list is investigated by another algorithm for peaks of multiply charged ions (usually this step can be omitted by MALDI mass spectrometry because in most cases exclusively singly charged ions are formed). If multiply charged ions are found (recognizable by non-integer mass distances of the isotope peaks), a charge deconvolution algorithm is started to obtain a peak list of neutral masses for the proteins only. In this case, also the superfluous or lacking proton masses from protonation or deprotonation of the proteins are corrected.

Third, the isotope peak pattern of each protein is reduced to a single peak which is assigned with the so-called monomolecular mass. This procedure is called isotope deconvolution; it retains a single intensity value for the single peak reflecting the intensity of the isotope group. Sometimes, this procedure also produces a kind of reconstructed spectrum consisting of a string of peak-containing data wherein the peaks show the original peak widths but no longer the isotopic peak groups. The reconstructed spectrum shows easily proteins, the isotope signals of which greatly overlap, in a clearly separated form. It is a favorable form for graphically displaying: one peak refers exactly to one protein.

The algorithms for these reduction steps can be combined to a single peak finding and mass assignment program.

Fourth, the reduced peak lists of the different spectra from the collections are compared for peaks not included in each of the single peak lists belonging to individual samples. The peak lists are then blown up to contain the same set of peaks in all peak lists (partly with zero intensities). The peak lists may be based on intensity/mass value pairs, or simply on the pairs of intensities and integer peak numbers. In a separate list, the peak numbers can be referred back to the precise masses of the substances underlying the peaks.

The result is two collections of greatly simplified and unified peak lists, from the two groups of patients each, containing roughly 50 to 300 protein peaks, depending on the kind of affinity extraction. These peak lists are subject to further pattern recognition algorithms. For the graphical display of the data, either the original spectra, the reconstructed de-isotoped spectra, or the peak lists may be used, the latter for bar graph presentations.

Figure 2:
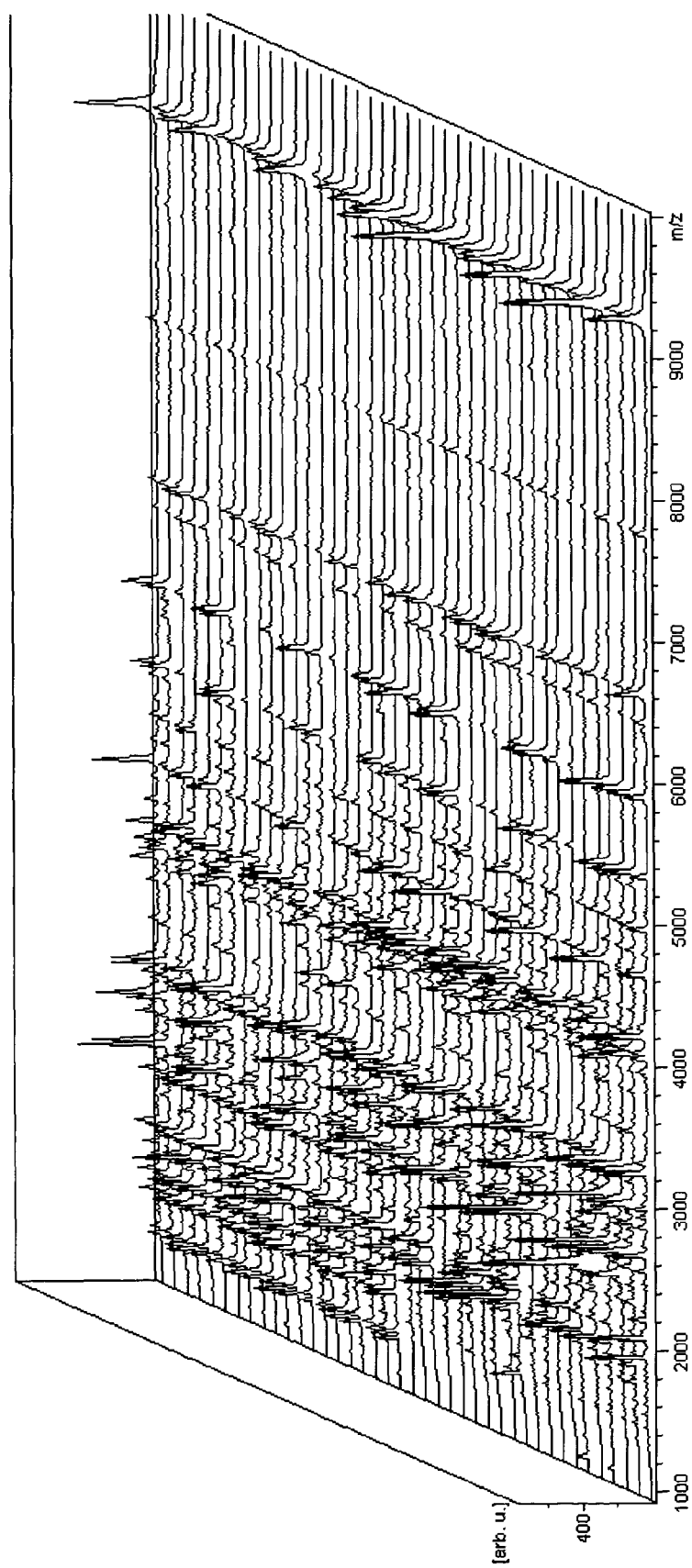
FIG. 2 shows a stacked spectrum plot of the same data strings.

It will here be assumed that the reconstructed de-isotoped spectra are used for the graphical display. The researcher usually can chose between several kinds of display, among which the density plot (see FIG. 1) and the stacked spectra display (see FIG. 2) are the most favorable ones.

The density plot uses one horizontal pixel line of the computer screen to display one spectrum, the intensities are displayed by a gray scale (or by another color). Even the presentation of the peak intensity by a range, a rainbow or a combination of colors may be applied. The different spectra of the collections are displayed one below the other in neighboring pixel lines. The result is a picture similar to an electrophoretic gel: vertical stripes of lighter or darker color represent the peaks throughout the collections of spectra. The user can change the color scale, he can zoom intensity or mass ranges, he can set and vary intensity thresholds to investigate the collection of spectra in more detail. The density plot is the most condensed way of showing a large number of spectra (even hundreds) in a single display window.

The two groups or collections of samples are displayed in the upper and lower part of the display. Visual inspection may reveal already peaks differing in intensity in the two collections of spectra, a first set of significant peaks. In general, however, this case is rather rare. Only more detailed investigations reveal groups of peaks which allow, by forming mathematical expressions like linear (or non-linear) combinations of several peak intensities, to separate the groups correctly by threshold values. These investigations may include cross correlation calculations between several peaks with fluctuating intensities within one group or between groups (indicating a common regulatory mechanism for the proteins), they may include supervised learning procedures to find mathematical expressions to separate the groups. There are many algorithms published in the literature, but details are not of interest here. Algorithms of this kind are subsummed her under the notion "pattern recognition algorithms".

In many cases the success of pattern recognition programs depend on intensity transformations performed before the pattern recognition programs are applied. Sometimes these transformations are called "filters". An example is the transformation of the intensities, which occupy only a half space above zero, into a logarithmic scale, occupying the full space from minus infinity to plus infinity. In addition, the average intensity of all peaks is very often transformed to zero. This filter brings more weight to the ratios of intensities than to their absolute values. Other filters apply non-linear functions to enhance small peaks.

Some supervised pattern recognition procedures depend very much, with respect to calculation time and separation success, on a favorable set of start peaks. For these kinds of programs the researcher in the field can pick an ensemble of peaks to start with. Other pattern recognition algorithms tend to eliminate correlating peaks, the user can, in this case, force the program to include these peaks into the list of significant peaks generating the separating pattern.

The researcher then can start the pattern recognition procedure and he can inspect the results immediately after the calculations have been finished. The results are shown in different ways: as usual, e.g., a score number for the quality of the separation can be presented, together with some other relevant information, and, according to this invention, the researcher can see the peaks participating significantly in the separation process highlighted in the graphic data display. Pattern recognition algorithms in general do not end with a predetermined, unique result; instead, they show just one arbitrarily selected mathematical solution out of a sometimes narrow and sometimes wide space of possible solutions. Therefore, the inventive procedure invites the researcher to play around with different types of filters, with several types of algorithms, with different ensembles of start peaks, different program parameters like thresholds, or different peaks enforced to be included in the result list. In this way, the researcher gains some feeling about the stability of the algorithms and the stability in the participation of some peaks in the separation criteria independently from the algorithm used.

If the researcher has found a set of peaks significantly governing the separation for the two groups of patients, the medical or biomolecular work starts. On one hand, he has to identify the proteins involved (for instance by tandem mass spectrometry measuring amino acid sequences by daughter ion spectra) and he has to search the literature for any knowledge about these proteins. On the other hand, he has to verify the separation power of the separation parameters found; this verification needs second collections of data strings from other groups of healthy and diseased patients.

The verification may use the same program with the same graphical display.

The question "is this protein a true disease marker?" has to be solved outside the range of the tools provided here for finding these markers.

There are many variations of this procedure for clinical proteomics, and there are many application outside clinical proteomics which cannot be described here in much detail. In clinical proteomics, e.g., the procedure described here can easily widened to comprise more than only two groups of patients. Groups of patients with diagnostically similar, but not related diseases may be added, or groups with different states of the same disease. Groups of patients with similar genetic assessment may be selected, and so on. New types of evaluation programs have to be written to include this aspect of widening to more than two groups, including new classification programs to differentiate the different groups. But the basic idea of marking the relevant peaks in the graphical display will have here the same positive aspect as in the example described above.

In this way, the specialized researcher in the field, and the specialized developer of corresponding programs, can vary the basic ideas of the invention in many ways. Without detailing the variations here, the should be basically included by the invention.

The invention claimed is:

1. A method for the investigation of patterns in collections of peak-containing data strings, each data string consisting of a set of intensity values and corresponding values of a scaling parameter, the method comprising the following steps:
    (a) displaying the data of the collections of the peak-containing data strings in graphical form,
    (b) calculating significant patterns, correlations or classifications within one or between different collections of the peak-containing data strings by pattern recognition algorithms, thereby including a determination of peaks significantly participating in the calculation of the significant patterns, correlations or classifications, and
    (c) highlighting, in the graphical display of the peak-containing data strings each intensity value corresponding to a scaling parameter value associated with a peak significantly participating in the calculation of the significant patterns, correlations or classifications.

2. A method according to claim 1 wherein the peak-containing data strings are displayed, in step (a), by a density plot.

3. A method according to claim 1 wherein features of the graphical display are interactively accessible.

4. A method according to claim 3 wherein an ensemble of start peaks for the pattern recognition algorithms is selected from the graphical display.

5. A method according to claim 3 wherein peaks are selected on the display before the pattern recognition algorithms are started and each intensity value that corresponds to a scaling parameter value associated with a selected peak is highlighted in the graphical display.

6. A method according to claim 3 wherein, after pattern recognition by the pattern recognition algorithms is completed, a peak on the graphical display is selected in order to show more information with respect to the peak's participation in the calculation of the significant patterns, correlations or classifications.

7. A method according to claim 1 wherein the intensity values of the peak-containing data strings are transformed by a filter before the pattern recognition algorithm is applied.

8. A method according to claim 1 wherein the peak-containing data strings are lists of peaks characterized by an intensity value and a scaling parameter value per peak.

9. A method according to claim 1 wherein the peak-containing data strings are mass spectra or chromatograms.

10. A method according to claim 9 wherein the mass spectra are mass spectra of biomolecules affinity extracted from body fluids.

11. A method according to claim 10 wherein the biomolecules are proteins.

12. A method according to claims 10 or 11, wherein the mass spectra include at least one mass spectrum acquired from patients who have a well-confirmed and well-documented disease and at least one mass spectrum acquired from patients who do not have the disease.

* * * * *